US012368926B2

(12) United States Patent
Wang et al.

(10) Patent No.: US 12,368,926 B2
(45) Date of Patent: Jul. 22, 2025

(54) VIDEO PLAYING METHOD, APPARATUS, ELECTRONIC DEVICE, STORAGE MEDIUM, AND PROGRAM PRODUCT

(71) Applicant: Beijing Zitiao Network Technology Co., Ltd., Beijing (CN)

(72) Inventors: Ruoxi Wang, Beijing (CN); Haiqiang Jiang, Beijing (CN); Yao Guo, Beijing (CN); Kai Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/809,080

(22) Filed: Aug. 19, 2024

(65) Prior Publication Data

US 2024/0414402 A1      Dec. 12, 2024

Related U.S. Application Data

(63) Continuation of application No. PCT/CN2023/074944, filed on Feb. 8, 2023.

(30) Foreign Application Priority Data

Feb. 17, 2022   (CN) .......................... 202210147573.1

(51) Int. Cl.
H04N 21/466      (2011.01)
H04N 21/442      (2011.01)
H04N 21/443      (2011.01)

(52) U.S. Cl.
CPC ... *H04N 21/4668* (2013.01); *H04N 21/44204* (2013.01); *H04N 21/4438* (2013.01)

(58) Field of Classification Search
CPC ......... H04N 21/4668; H04N 21/44204; H04N 21/4438; H04N 21/47202;
(Continued)

(56) References Cited

U.S. PATENT DOCUMENTS 10,750,245 B1 *   8/2020   Zeiler ................... G06F 16/745
2004/0040040 A1 *  2/2004   Danker .............. H04N 21/4756
                                                              725/47
(Continued)

FOREIGN PATENT DOCUMENTS

CN          103092603 A      5/2013
CN          108134950 A      6/2018
(Continued)

OTHER PUBLICATIONS

China Patent Application No. 202210147573.1; Notification to Grant; dated Aug. 23, 2023; 6 pages.
(Continued)

*Primary Examiner* — Cynthia M Fogg
(74) *Attorney, Agent, or Firm* — BakerHostetler (57) ABSTRACT

Provided in the present disclosure are a video playing method and apparatus, and an electronic device, a storage medium and a program product. The method includes: receiving a playing operation for the current video; if the current video is a target video, playing the current video in a video playing page, and displaying a feedback control of the current video, wherein the feedback control is used for triggering feedback of non-interest to the current video; and if the current video is not the target video, playing the current video in the video playing page.

20 Claims, 6 Drawing Sheets

(58) Field of Classification Search
CPC ......... H04N 21/25891; H04N 21/4383; H04N 21/251; H04N 21/4182; H04N 21/45; H04N 21/4532; H04N 21/466; H04N 21/4755; H04N 21/4826
USPC .......................................................... 725/46
See application file for complete search history.

(56) References Cited

U.S. PATENT DOCUMENTS

| | | | | |
|---|---|---|---|---|
| 2006/0048189 | A1* | 3/2006 | Park | G06F 3/013 725/12 |
| 2007/0288966 | A1* | 12/2007 | Javid | H04N 21/4755 348/E7.071 |
| 2010/0122293 | A1* | 5/2010 | Craner | H04N 21/812 725/40 |
| 2013/0290339 | A1* | 10/2013 | LuVogt | G06Q 50/01 707/E17.089 |
| 2014/0143250 | A1 | 5/2014 | Martin et al. | |
| 2015/0039685 | A1 | 2/2015 | Lewis et al. | |
| 2015/0326688 | A1* | 11/2015 | Aarnio | G06F 16/683 707/748 |
| 2015/0332335 | A1 | 11/2015 | Abraham et al. | |
| 2016/0156951 | A1* | 6/2016 | Perinchery | H04N 21/4334 725/14 |
| 2018/0130075 | A1 | 5/2018 | Roy | |
| 2022/0095009 | A1* | 3/2022 | Hong | H04N 21/2368 |
| 2024/0078589 | A1* | 3/2024 | Min | G06Q 30/02 |
| 2024/0094875 | A1* | 3/2024 | Jian | A63F 13/533 |

FOREIGN PATENT DOCUMENTS

| | | | | |
|---|---|---|---|---|
| CN | 108932103 | A | | 12/2018 |
| CN | 305154680 | S | | 5/2019 |
| CN | 110598016 | A | | 12/2019 |
| CN | 111177575 | A | | 5/2020 |
| CN | 111736746 | A | | 10/2020 |
| CN | 110222233 | B | * 1/2021 | ........... G06F 16/735 |
| CN | 113032682 | A | | 6/2021 |
| CN | 306722187 | S | | 7/2021 |
| CN | 113449144 | A | | 9/2021 |
| CN | 114297470 | A | * 4/2022 | |
| CN | 114531614 | A | | 5/2022 |
| CN | 114531614 | B | | 9/2023 |
| EP | 4123983 | A1 | | 1/2023 |
| WO | WO 2020/259572 | A1 | | 12/2020 |
| WO | WO 2021/208607 | A1 | | 10/2021 |

OTHER PUBLICATIONS

China Patent Application No. 202210147573.1; First Office Action; dated Mar. 27, 2023; 9 pages.
China Patent Application No. 202210147573.1; Second Office Action; dated Jun. 20, 2023; 9 pages.
International Patent Application No. PCT/CN2023/074944; Int'l Search Report; dated May 26, 2023; 2 pages.
European Patent Application No. 23755719.4; Extended Search Report; dated Feb. 13, 2025; 12 pages.

* cited by examiner

VIDEO PLAYING METHOD, APPARATUS, ELECTRONIC DEVICE, STORAGE MEDIUM, AND PROGRAM PRODUCT

CROSS-REFERENCE TO RELATED APPLICATIONS

This application is a continuation of International application No. PCT/CN2023/074944, filed on Feb. 8, 2023, which claims the priority to and benefits of Chinese Patent Application No. 202210147573.1, filed on Feb. 17, 2022. All the aforementioned patent applications are hereby incorporated by reference in their entireties.

TECHNICAL FIELD

The present disclosure relate to a field of computer technology, for example, to a video playing method, apparatus, electronic device, storage medium, and program product.

BACKGROUND

Users can provide feedback on recommended videos when viewing the recommended videos. However, in the related art, the means for users to provide a non-interest feedback on recommended videos is relatively limited and cannot meet the users' needs.

SUMMARY

The present disclosure provides a method, apparatus, electronic device, storage medium, and program product for playing videos, aiming to enrich the feedback methods for videos.

In a first aspect, the present disclosure provides a video playing method, comprising:
  receiving a play operation for a current video;
  playing the current video on a video play page and displaying a feedback control for the current video when the current video is a target video, wherein the feedback control is configured to trigger a non-interest feedback on the current video; and
  playing the current video on the video play page when the current video is not the target video.

In a second aspect, the present disclosure provides a video play apparatus, comprising:
  an operation receiving module configured to receive a play operation for a current video;
  a control display module configured to play a current video on a video play page and display a feedback control for the current video when the current video is a target video, wherein the feedback control is configured to trigger a non-interest feedback on the current video; and
  a video play module configured to display the current video on the video play page when the current video is not the target video.

In a third aspect, the present disclosure provides an electronic device, comprising:
  one or more processors; and
  a memory configured to store one or more programs,
  wherein when the one or more programs are executed by the one or more processors, the one or more processors are caused to perform the video playing method as described above.

In a fourth aspect, embodiments of the present disclosure provide a computer-readable storage medium, with computer programs stored thereon, and the video playing method described above is performed when the computer program is executed by a processor.

In a fifth aspect, embodiments of the present disclosure provide a computer program product, wherein the video playing method as described above is performed when the computer program product is executed by a computer.

DETAILED DESCRIPTION

Hereinafter the embodiments of the present disclosure are described with reference to the accompanying drawings. Although some embodiments of the present disclosure are shown in the accompanying drawings, the present disclosure can be implemented by various means. The embodiments are provided to facilitate understanding the present disclosure. The accompanying drawings and embodiments of the present disclosure are merely used for illustrative purposes.

The steps of the method embodiments of the present disclosure can be performed in different orders, and/or in parallel. In addition, the method embodiments can comprise additional steps and/or omit to perform the steps as shown. The scope of the present disclosure is not limited in this respect.

As used herein, the term "comprise" and its variants is an inclusion in an open mode, that is, "comprising, but being not limited to". The term "based on" means "at least partially based on". The term "an/one embodiment" represents "at least one embodiment"; the term "another embodiment" represents "at least one additional embodiment"; and the term "some embodiments" represents "at least some embodiments". The related definitions of other terms are provided in the following description.

The concepts such as "first" and "second" mentioned in the present disclosure are only used to distinguish different apparatuses, modules or units, and are not intended to limit the order of functions performed by these apparatuses, modules or units or the interdependence relationships between the apparatuses, modules or units.

The modifications with "a/an/one" or "a plurality of/multiple" mentioned in the present disclosure are schematic, rather than restrictive. Persons skilled in the art should understand that they should be construed as "one or more", unless specified in the context.

The message or message name interacted between multiple apparatus in the embodiments of the present disclosure are merely used for illustrative purpose, and are not intended to limit the message or the scope of the message.

Figure 1:
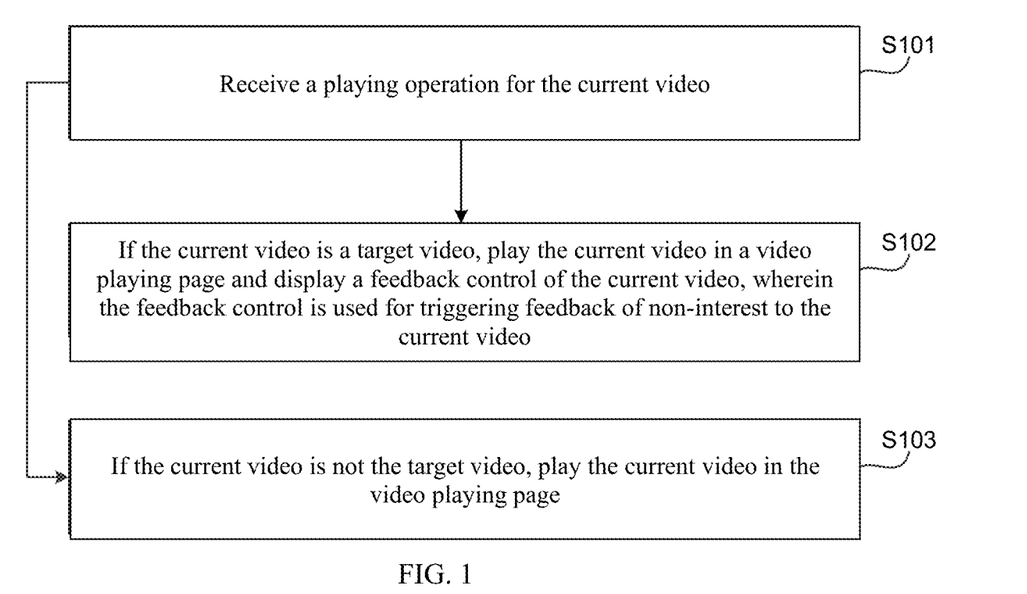
FIG. 1 is a schematic flowchart of a video playing method provided in an embodiment of the present disclosure.

FIG. 1 is a schematic flowchart of a video playing method provided in an embodiment of the present disclosure. The method may be performed by a video play apparatus. The apparatus may be implemented with software and/or hardware, and may be configured in an electric equipment. For example, the apparatus may be configured in a mobile phone or a tablet computer. The video playing method provided in the embodiments of the present disclosure is applicable to scenarios where a feedback control is displayed on the video play page of a part of the videos. As shown in FIG. 1, the video playing method provided in this embodiment may comprise:

S101: Receiving a play operation for a current video. Then the process forwards to S102 or S103.

The play operation may be an operation for playing a video, e.g., an operation for triggering a play control for a video, or an operation of switching videos. The current video may be a video which the play operation instructs to play. The current video may be any type of video, for example, the current video may be a recommended video. Hereinafter, we shall take the example where the current video is a recommended video.

A user may perform a play operation for the current video, e.g., triggering a play control corresponding to the current video, or switching from another video currently being played to the current video, when the user intends to play the current video.

S102: Playing the current video on a video play page and displaying a feedback control for the current video when the current video is a target video, wherein the feedback control is configured to trigger a non-interest feedback on the current video.

S103: Playing the current video on the video play page when the current video is not the target video.

The target video may refer to a video that meets a preset condition. The preset condition may be set according to needs. For example, the preset condition may be set such that a feedback score is greater than or equal to a preset score threshold.

Figure 2:
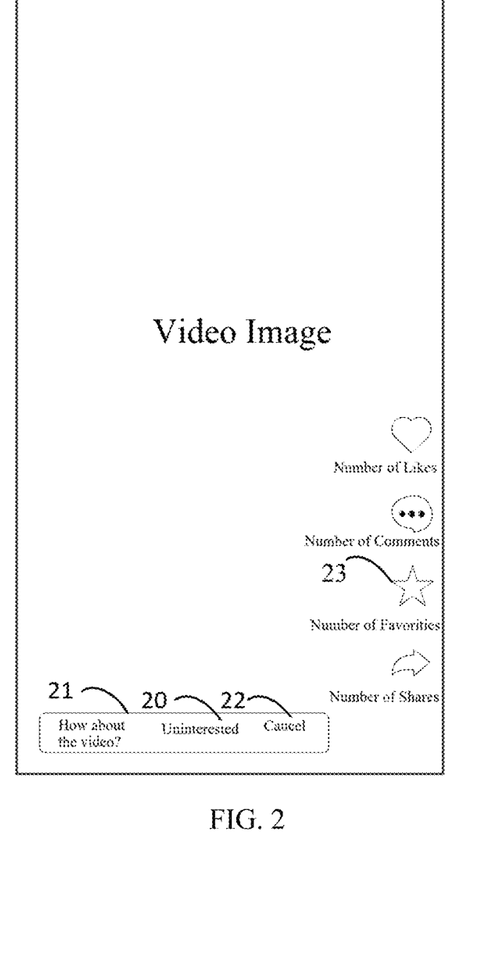
FIG. 2 is a schematic view for displaying a feedback control provided in an embodiment of the present application.
Figure 3:
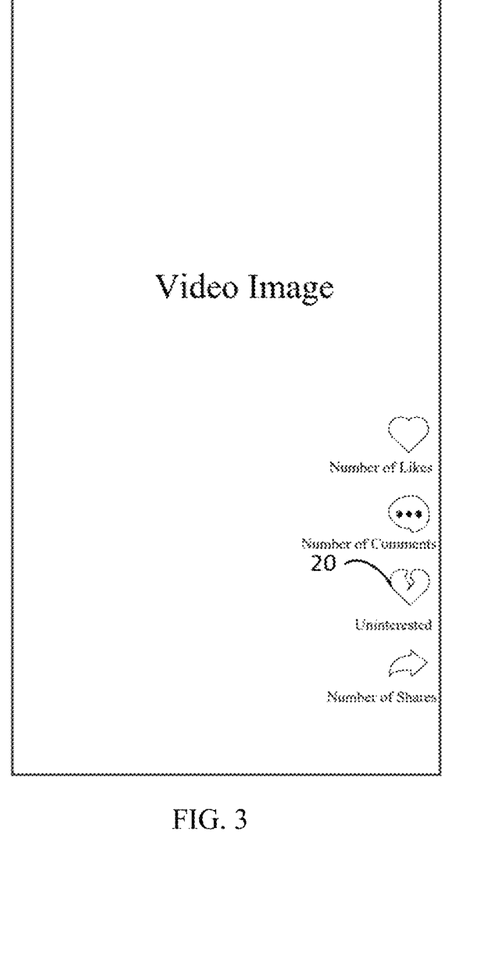
FIG. 3 is a schematic view for displaying another feedback control provided in an embodiment of the present disclosure.

The electronic device determines whether or not the current video is the target video, upon receipt of the play operation for the current video. By way of example, the electronic device determines whether or not the current video satisfies the preset condition for the target video. As an example, the feedback score of the current video is obtained from a server, and it determines whether or not the feedback score is greater than or equal to the preset score threshold; or determines whether or not the current video has a target identification. If the feedback score is greater than or equal to the preset score threshold or if the current video has a target identification, the current video is determined as the target video, and the current video is played on a video play page, and a feedback control 20 associated with the current video is displayed on the video play page, as shown in FIG. 2 and FIG. 3. If the feedback score is less than the preset score threshold or if the current video does not have a target identification, it is determined that the current video is not the target video, and the current video is played on the video play page, but the feedback control 20 associated with the current video is not displayed on the video play page. Among them, the target identification can be configured to identify the target video. That is, when a video has the target identification, it means that the video is a target video; and when a video does not have the target identification, it means that the video is not the target video. The target identification may be added by a server to a target video that satisfies the preset condition.

In addition, the display format of the feedback control 20 on the video play page can be flexibly configured. For example, the feedback control 20 can be displayed in the form of a feedback bar 21, or displayed within the feedback bar 21 itself (as shown in FIG. 2). Alternatively, it can also be displayed in the form of an icon (as shown in FIG. 3). When the feedback control 20 for the current video is displayed, a cancel control 22 can be displayed, as shown in FIG. 2. As a result, the user can instruct the electronic device to cancel the display of the feedback control 20 by activating the cancel control 22, e.g., instructing the electronic device to cease displaying the feedback bar 21 or to no longer display the feedback control 20.

The user can also provide a non-interest feedback on the current video in other ways when the feedback control is displayed on the video play page. For example, the user can perform a long-press operation within the video display page to instruct the electronic device to display a long-press panel for the current video, and trigger the feedback control displayed on the long-press panel to provide a non-interest feedback on the current video. Or, the user can instruct the electronic device to display a share panel for the current video by triggering a share control associated with the current video displayed on the video play page and triggering the feedback control displayed on the share panel to provide a non-interest feedback on the current video. In other words, regardless of whether the current video is the target video or not, the electronic device can display the feedback control for the current video on a panel, such as, a long-press panel or a share panel, enabling the user to provide a non-interest feedback for the current video.

In the present embodiment, the feedback control is displayed on the video play page only during the process of playing some videos (e.g., recommended videos with feedback score greater than the preset score threshold), while for other videos (e.g., unrecommended videos with feedback score less than the preset score threshold), the feedback control is not displayed on the video playback page. That is, different methods are employed to display feedback controls for videos satisfying different conditions. Correspondingly, when a feedback control is displayed on the video play page, the user can provide a non-interest feedback on the video being currently played by triggering the feedback control, or instruct the electronic device to display a corresponding panel provided with the feedback control (such as, a long-press panel or a share panel), and trigger the feedback control to provide the non-interest feedback on the corresponding video. When the feedback control is not displayed on the video play page, the user can instruct the electronic device to display a corresponding panel provided with the feedback control, and trigger the feedback control to provide a non-interest feedback on the video being currently played. As a result, it can not only enrich the methods of giving feedbacks to videos, but also shorten the feedback path of the videos, simplify the operations required by providing non-interest feedbacks on the videos, and improve the user experience.

In an embodiment, the displaying the feedback control for the current video comprising: displaying the feedback control for the current video and a preset control; or replacing the preset control with the feedback control for the current video for display purposes.

The preset control can be a control constantly displayed on the video play page in the process of playing different videos; and can also be a control corresponding merely to the current video, such as, a like control, a comment control, a favorite control, or a share control for the current video.

In this embodiment, the display mode of the feedback control 20 for the current video can be flexibly configured. For example, in relation to various controls which are displayed on the video play page when the current video is not the target video, the feedback control 20 for the current video can be additionally displayed on the video play page, as shown in FIG. 2. Alternatively, the preset control displayed on the video play page can be switched to display the feedback control 20 for the current video, that is, the feedback control 20 for the current video is displayed at a display position of the preset control on the video play page, while the preset control is no longer displayed on the video play page until the current video changes. This approach aims to prevent the feedback control 20 from causing obstructions to the video images of the current video during playing the current video on the video play page, thereby improving the user's video viewing experience.

Taking the preset control as the favorite control 23 for the current video as an example, when the current video is the target video, the feedback control 20 and the favorite control 23 for the current video can be simultaneously displayed on the video play page during the process of playing the current video, as shown in FIG. 2. Alternatively, the feedback control 20 for the current video can also be displayed at the preset display position of the favorite control 23 for the current video on the video play page, while the favorite control 23 for the current video is no longer displayed, as shown in FIG. 3.

According to the video playing method provided in the present embodiment, the play operation for the current video is received; the current video is played on the video play page and the feedback control for the current video is displayed when the current video is the target video, wherein the feedback control is configured to trigger a non-interest feedback on the current video; and the current video is played on the video play page when the current video is not the target video. By using the above technical solution, in the present embodiment, the feedback control is displayed for some videos during the process of playing the corresponding videos, which can not only enrich the modes of providing non-interest feedbacks on the videos, but also shorten the feedback path of the videos, simplify the operations required by providing non-interest feedbacks on the videos, thereby improving the user experience.

Figure 4:
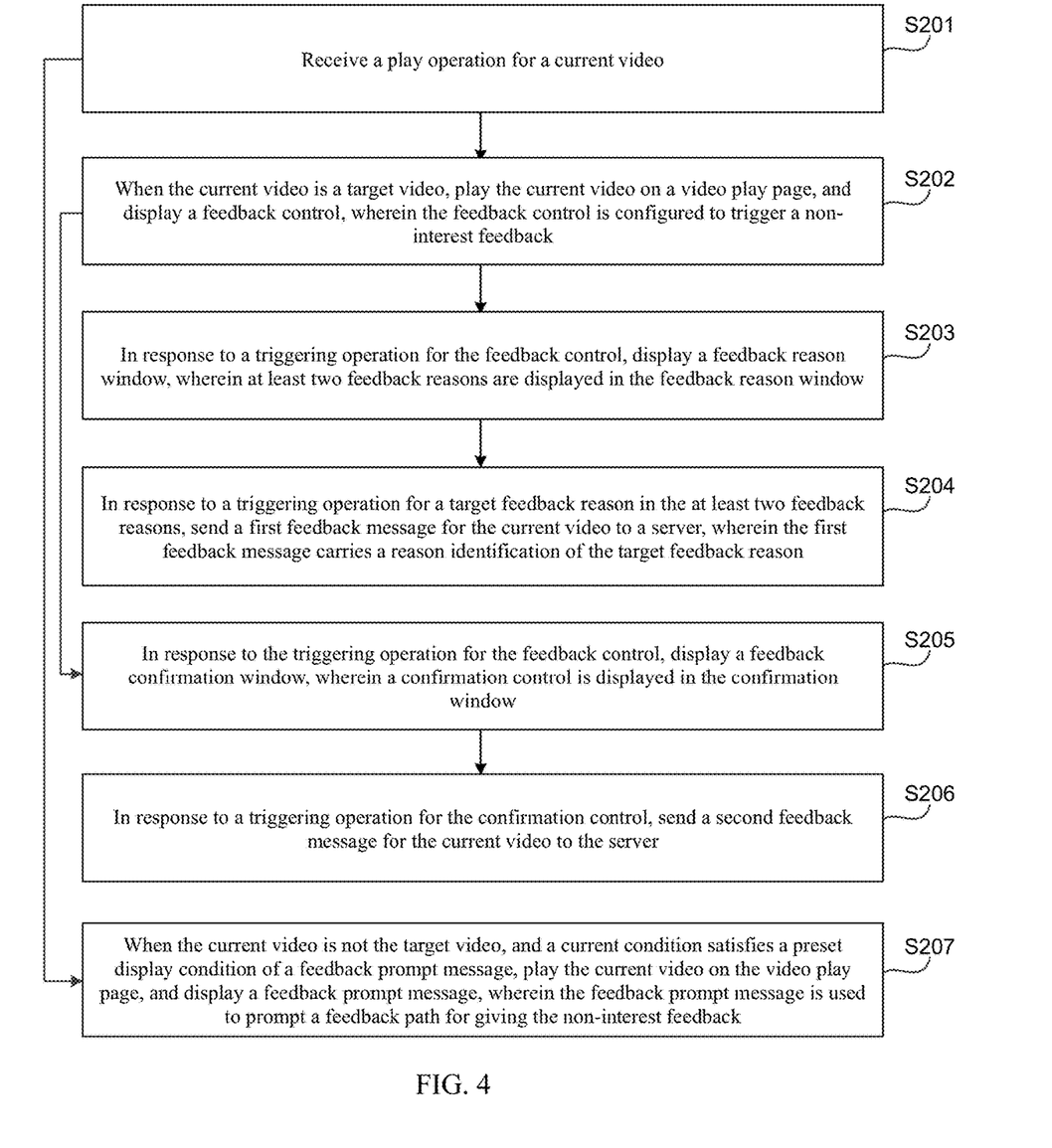
FIG. 4 is a schematic flowchart of another video playing method provided in an embodiment of the present disclosure.

FIG. 4 is a schematic flowchart of another video playing method provided in an embodiment of the present disclosure. The solution in the present embodiment can be combined with one or more solutions in the above embodiments. After displaying the feedback control for the current video, the method further comprises: in response to a triggering operation for the feedback control, displaying a feedback-reason window in which at least two feedback reasons are displayed; and in response to a triggering operation for a target feedback reason of the at least two feedback reasons, sending a first feedback message on the current video to a server, wherein the first feedback message carries a reason identification of the target feedback reason.

After displaying the feedback control for the current video, the method further comprises: in response to the triggering operation for the feedback control, displaying a feedback confirmation window in which a confirmation control is displayed; and in response to a triggering operation for the confirmation control, sending a second feedback message on the current video to the server.

The playing the current video on the video play page when the current video is not the target video comprises: playing the current video on the video play page and displaying a feedback prompt message, when the current video is not the target video and the current condition satisfies a preset display condition of the feedback prompt message, wherein the feedback prompt message is configured to prompt a feedback path for providing non-interest feedbacks.

Correspondingly, as shown in FIG. 4, the video playing method provided in the present embodiment may comprise:

S201: Receiving a play operation for a current video, and then the process forwards to S202 or S207.

S202: Playing the current video on a video play page and displaying a feedback control for the current video when the current video is a target video, and performing S203 or S205, wherein the feedback control is configured to trigger a non-interest feedback on the current video.

S203: In response to a triggering operation for the feedback control, displaying a feedback-reason window in which at least two feedback reasons are displayed.

The feedback-reason window may be a window configured to display feedback reasons for user's selection, in which at least two feedback reasons are displayed. Different feedback reasons may correspond to the same or different feedback dimensions, which comprises, for example, dimensions of video content, video author, background music of the video and/or video category (such as, the theme), or the like. As an example, different feedback reasons correspond to different feedback dimensions including a dimension of background music of the video.

Figure 5:
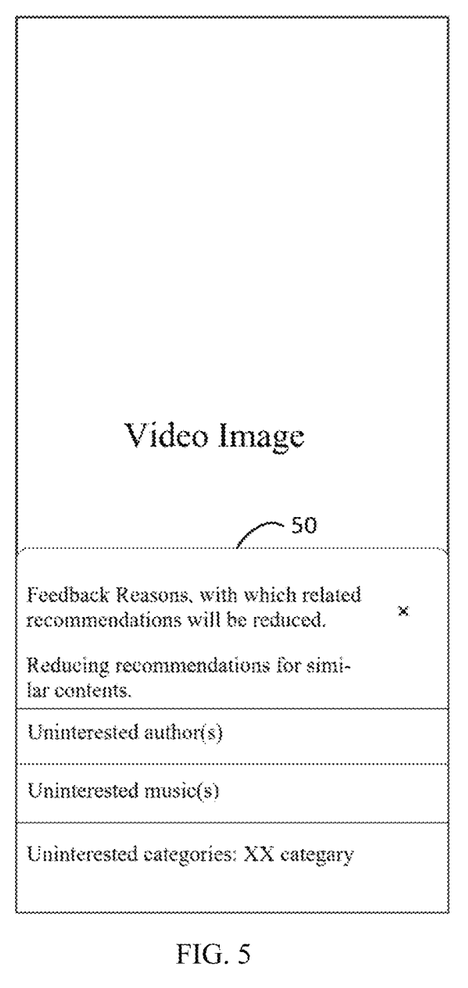
FIG. 5 is a schematic view of a feedback-reason window provided in an embodiment of the present disclosure.

By way of example, as shown in FIG. 2 and FIG. 3, the electronic device displays the feedback control 20 for the current video on the video play page when playing the current video. As a result, the user can trigger the feedback control 20 when he/she wants to provide a non-interest feedback on the current video. Correspondingly, when detecting that the user triggers the feedback control 20 for the current video, the electronic device may display a feedback-reason window 50 in which at least two feedback reasons are displayed, as shown in FIG. 5.

S204: In response to a triggering operation for a target feedback reason of the at least two feedback reasons, sending a first feedback message on the current video to a server, and ending the operation, wherein the first feedback message carries a reason identification of the target feedback reason.

The target feedback reason can be the feedback reason triggered by the user. The reason identification of the target feedback reason may uniquely identify the target feedback reason, such as, a reason identifier (ID) or content of the target feedback reason. The first feedback message may be a feedback message on the current video, which may carry the reason identification of the target feedback reason, and may carry a video identification of the current video.

By way of example, when the user wants to select a certain feedback reason in the feedback-reason window, he/she triggers the certain feedback reason, to provide the non-interest feedback. Correspondingly, upon detecting that the user triggers the feedback reason, the electronic device will generate a feedback message (i.e., the first feedback message) carrying the video identification of the current video and the reason identification of the feedback reason, and send this feedback reason to the server. In addition, the electronic device may close the feedback-reason window upon detecting that the user triggers a certain feedback reason, and display a feedback success prompt message to prompt the user that the feedback has been successfully submitted.

In the present embodiment, multiple feedback reasons can be displayed for the user's selection when the user triggers the feedback control. Consequently, this enables the user to provide a targeted non-interest feedback, and based on the user's feedback, this can reduce recommendations for videos corresponding to the selected reasons, thereby improving the user experience.

S205: In response to a triggering operation for the feedback control, displaying a feedback confirmation window in which a confirmation control is displayed.

By way of example, as shown in FIG. 2 and FIG. 3, when playing the current video, the electronic device displays the feedback control 20 for the current video on the video play page. Consequently, the user may trigger the feedback control 20 when he/she is not interested in the current video and wants to provide a non-interest feedback on the current video. Correspondingly, upon detecting that the user triggers the feedback control 20 for the current video, the electronic device may display a feedback confirmation window 60 in which a cancel control 61 and a confirmation control 62 can be displayed, as shown in FIG. 6, so as to prompt the user to confirm again whether he/she indeed wants to provide the non-interest feedback on the current video or not, thus preventing accidental feedback due to the user's mistaken touches.

S206: In response to a triggering operation for the confirmation control, sending a second feedback message on the current video to a server to end the operation.

The second feedback message can be a feedback message on the current video. The second feedback message may carry the video identification of the current video, without carrying any reason why the user provides non-interest feedback.

Figure 6:
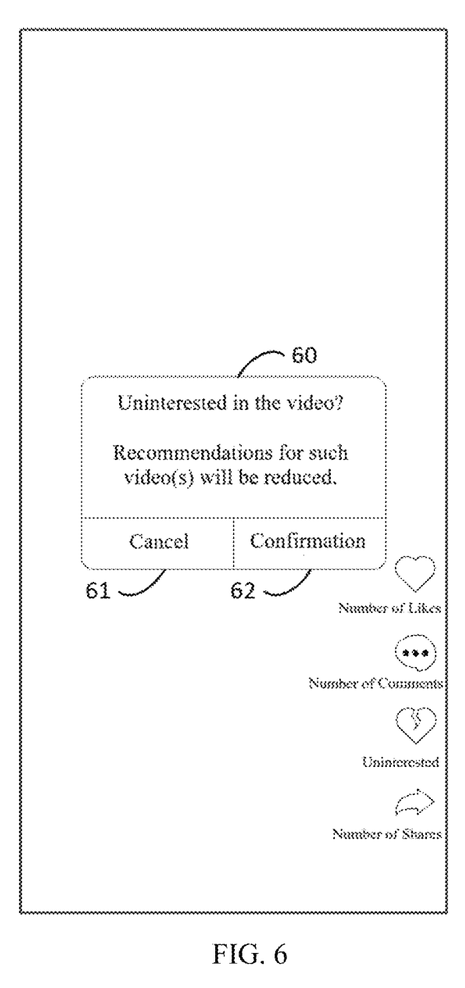
FIG. 6 is a schematic view of a feedback confirmation window provided in an embodiment of the present application.

By way of example, as shown in FIG. 6, the user can trigger the confirmation control 62 in the feedback confirmation window 60 when the user confirms that he/she wants to provide the non-interest feedback. Correspondingly, the electronic device generates a feedback message (i.e., the second feedback message) carrying the video identification of the current video when detecting that the user triggers the confirmation control 62, and send this feedback message to the server. Also, the electronic device can close the feedback confirmation window 60 when detecting that the user triggers the confirmation control 62, and display a feedback success prompt message to prompt the user that the feedback is successfully submitted.

In addition, referring to FIG. 6, the user can trigger the cancel control 61 in the feedback confirmation window 60 when the user confirms that he/she does not want to give the non-interest feedback. As a result, the electronic device can close the feedback confirmation window 60 when detecting that the user triggers the cancel control 61.

In the present embodiment, the electronic device can also directly generate a feedback message (i.e., the second feedback message) carrying the video identification of the current video when detecting that the user triggers the feedback control, and send the feedback message to the server without displaying the feedback-reason window or the feedback confirmation window, thus simplifying the operations required the user to do when giving non-interest feedbacks.

For example, the electronic device may determine whether the total number of times that the user provides non-interest feedbacks is less than or equal to a preset number threshold or not, when detecting that the user triggers the feedback control. If the total number of times that the user provides non-interest feedbacks is less than or equal to a preset number threshold, the process proceeds to S205-S206. Otherwise, if the total number of times that the user provides non-interest feedbacks is greater than a preset number threshold, the second feedback message is directly generated and sent to the server.

In addition, when detecting that the user triggers a feedback reason in S204 or detecting that the user triggers the confirmation control in S206, the video being currently played can also be switched, e.g., from the current video to the next video to be played.

S207: When the current video is not the target video and the current condition satisfies the preset display condition of the feedback prompt message, playing the current video on the video play page and displaying a feedback prompt message, wherein the feedback prompt message is used to prompt a feedback path for giving non-interest feedbacks.

In the present embodiment, when the current video is not the target video and the current condition satisfies the preset display condition, a prompt for the feedback path can be provided to the user, thus preventing situations where the user is unable to provide non-interest feedbacks due to his/her unawareness of the existence of such a non-interest feedback function of the application or his/her lack of knowledge on how to provide such non-interest feedbacks, thereby improving the user experience.

The preset condition can be set as needed. For example, the preset condition can be set so that the user has not provided a non-interest feedback within a preset number of days, and/or the user has consecutively skipped n videos (that is, the actual play duration of each of the n consecutive videos are all less than the preset duration) and the like. Here, the preset number of days, the value of n, and the preset duration threshold can all be set as needed. For example, the preset number of days can be set as 20 days or 30 days or the like; n can be set as 3 or 5 or the like; and the preset duration threshold can be set as 1 s (1 second) or 2 s (2 seconds) or the like. The actual play duration of a video may be the time duration for which the video is actually played on the video play page, that is, the duration for which the user watches the video. The feedback path can be a triggering path for providing a non-interest feedback on the video.

Figure 7:
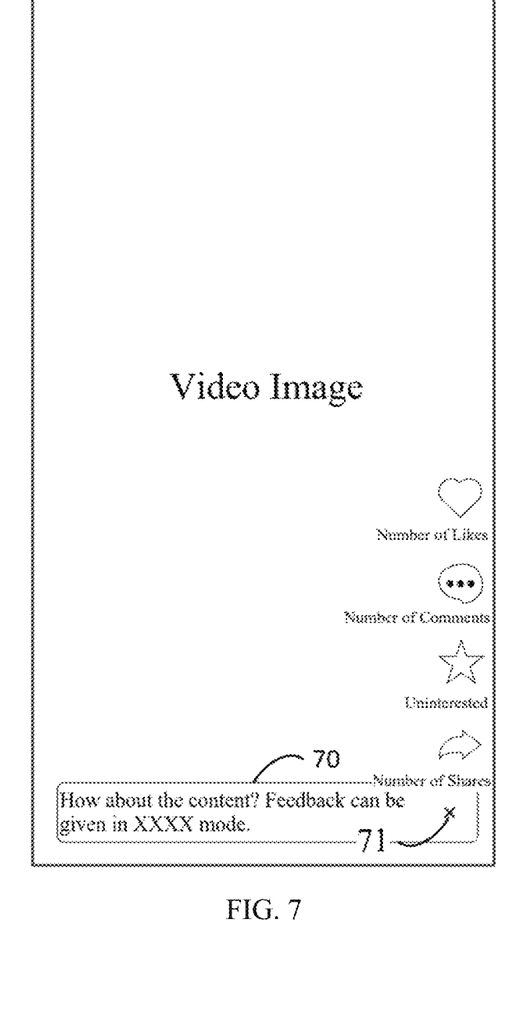
FIG. 7 is a schematic view of a feedback prompt message provided in an embodiment of the present application.

By way of example, the electronic device may determine whether the current condition satisfies the preset display condition of the feedback prompt message or not, when determining that the current video is not the target video. If the current condition satisfies the preset display condition of the feedback prompt message, the current video is played on the video play page and the feedback prompt message 70 is displayed, as shown in FIG. 7. Otherwise, if the current condition does not satisfy the preset display condition of the feedback prompt message, only the current video is played on the video play page, while the feedback prompt message 70 is not displayed.

In an embodiment, the preset display condition comprises that the number of times of displaying the feedback prompt message does not reach the current preset number threshold, and after displaying the feedback prompt message, the method further comprises: canceling displaying the feedback prompt message in response to a cancel prompt operation for the feedback prompt message, wherein the current preset number threshold decreases after canceling displaying the feedback prompt message.

The current preset number threshold can be a threshold of total number of times of displaying the feedback prompt message or a number threshold of displaying the feedback prompt message within a preset duration. The cancel prompt operation can be an operation instructing the electronic device to cancel the display of the feedback prompt message, e.g., an operation of triggering a close control 71 corresponding to the feedback prompt message (as shown in FIG. 7).

In the above embodiment, when determining whether to display the feedback prompt message, it is also possible to consider the number of times the feedback prompt message has been displayed. For example, the feedback prompt message can be displayed only when the user has not provided any non-interest feedback in the preset number of recent days, and/or when the actual play duration of each of the last n videos played on the video play page prior to the current video is less than the preset duration threshold, and the number of times of displaying the feedback prompt message does not reach the preset number threshold. The user can instruct the electronic device to stop displaying the feedback prompt message by triggering the cancel prompt operation, and the electronic device can reduce the current preset number threshold of the feedback prompt message depending on whether the user has triggered the cancel prompt operation, thereby avoiding excessive display of feedback prompt message that may interfere with the user's video viewing experience.

By way of example, the user can perform the cancel prompt operation when he/she wants to close the feedback prompt message displayed by the electronic device. Correspondingly, the electronic device can cancel displaying the feedback prompt message upon receiving the cancel prompt operation performed by the user, and reduce the current preset number threshold for the feedback prompt message.

The electronic device can reduce the current preset number threshold every time when the user performs the cancel prompt operation for the feedback prompt message, until the current preset number threshold equals to zero. As an alternative, the electronic device can reduce the current preset number threshold only when the user performs the operation for the first time or for many times (e.g., when the performing number reaches a preset number), until the current preset number threshold equals to zero.

Moreover, in addition to stopping the feedback prompt message in response to the user's cancel prompt operation, the electronic device can also automatically stop displaying the feedback prompt message when a preset condition is satisfied. For example, the electronic device can automatically stop displaying the feedback prompt message when the video being currently played changes, and/or, when the display duration of the feedback prompt message reaches the preset duration (such as, 3 seconds or 5 seconds) to facilitate the user's viewing of the video being currently played.

The video playing method provided in this embodiment prompts the user to provide non-interest feedbacks in different ways, and provides responses in different ways when the user triggers the feedback control, thereby enriching the triggering methods and the response types, and thus improving the user experience.

Figure 8:
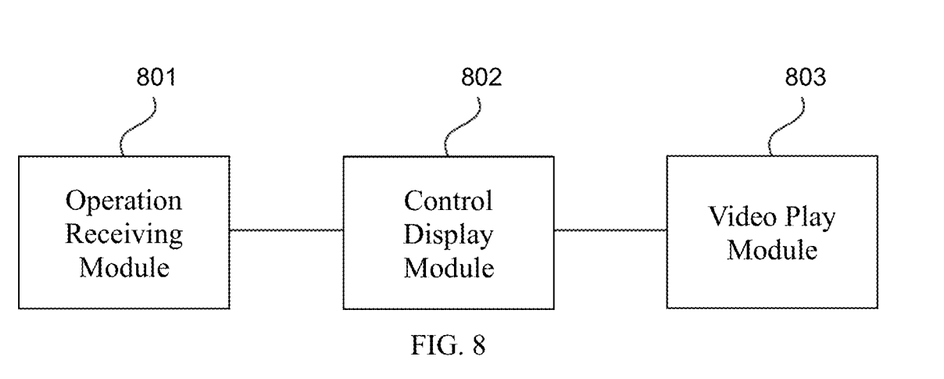
FIG. 8 is a structural block diagram of a video play apparatus provided in an embodiment of the present disclosure.

FIG. 8 is a structural block diagram of a video play apparatus provided in an embodiment of the present disclosure. The apparatus can be implemented with software and/or hardware, and can be configured in an electric equipment, for example, the apparatus can be configured in a mobile phone or a tablet computer. The apparatus can display a feedback control on the video play page of some videos by performing the video playing method. As shown in FIG. 8, the video play apparatus provided in the present embodiment comprises: an operation receiving module 801, a control display module 802, and a video play module 803.

The operation receiving module 801 is configured to receive a play operation for a current video.

The control display module 802 is configured to play the current video on a video play page and display a feedback control for the current video when the current video is a target video, wherein the feedback control is configured to trigger a non-interest feedback on the current video.

The video play module 803 is configured to display the current video on the video play page when the current video is not the target video.

The video play apparatus provided in the present embodiment receives a play operation for the current video by the operation receiving module 801; plays the current video on a video play page and displays a feedback control for the current video when the current video is a target video by the control display module 802, wherein the feedback control is configured to trigger a non-interest feedback on the current video; and plays the current video on the video play page by the video play module 803 when the current video is not the target video. By means of the above technical solution according to the present embodiment, feedback control is displayed for some videos during the process of playing the corresponding videos, which can not only enrich the modes of providing non-interest feedbacks to videos, but also shorten the feedback path of the videos, simplify the operations required to provide non-interest feedbacks on the videos, and thus improving the user experience.

In the above embodiment, the control display module 802 can be configured to display the feedback control for the current video and a preset control; or replace the preset control with the feedback control for the current video for display purposes.

In the above embodiment, the video play apparatus provided in this embodiment can further comprise a reason window display module and a first sending module. The reason window display module is configured to display a feedback-reason window in response to a triggering operation for the feedback control after displaying the feedback control for the current video, wherein at least two feedback reasons are displayed in the feedback-reason window. The first sending module is configured to send a first feedback message on the current video to a server in response to a triggering operation for a target feedback reason of the at least two feedback reasons, wherein the first feedback message carries a reason identification of the target feedback reason.

In the above embodiment, different feedback reasons can correspond to different feedback dimensions, wherein the different feedback dimensions include a dimension of background music.

In the above embodiment, the video play apparatus can further comprise: a confirmation window display module and a second sending module. The confirmation window display module is configured to display a feedback confirmation window in response to a triggering operation on the feedback control after displaying the feedback control for the current video, wherein a confirmation control is displayed in the feedback confirmation window. The second sending module is configured to send a second feedback message on the current video to the server in response to a triggering operation on the confirmation control.

In the above embodiment, the video play module 803 can be configured to play the current video on the video play page and display a feedback prompt message when the current video is not the target video and the current condition satisfies a preset display condition of the feedback prompt message, wherein the feedback prompt message is used to prompt a feedback path for giving a non-interest feedback.

In the above embodiment, the preset display condition includes that the number of times of displaying the feedback prompt message has not reached the current preset number threshold. The video play apparatus provided in this embodiment can further comprise a cancel display module, which is configured to cancel the display of the feedback prompt message in response to a cancel prompt operation for the feedback prompt message after displaying the feedback prompt message, wherein the current preset number threshold decreases after canceling the display of the feedback prompt message.

The video play apparatus provided in the embodiments of the present disclosure can perform the video playing method provided in any embodiment of the present disclosure, and possess corresponding functional modules and beneficial effects for performing the video playing method. The technical details not exhaustively described in this embodiment may be referred to the video playing methods provided in any embodiment of the present disclosure.

Hereinafter, referring to FIG. 9, which shows a structural schematic diagram of an electronic device (e.g., a terminal device) 900 that is applicable to implement the embodiment of the present disclosure. The terminal device in the embodiment of the present disclosure can comprise, but is not limited to, mobile terminal such as mobile phone, laptop, digital broadcast receiver, Personal Digital Assistant (PDA), Portable Android Device (PAD), Portable Media Player (PMP), and vehicle terminal (e.g., vehicle navigator terminal) and fixed terminals such as digital television (TV), desktop computer and etc. The electronic device 900 shown in FIG. 9 is merely an example, and should not bring any limitation to the function and application scope of the embodiment of the present disclosure.

Figure 9:
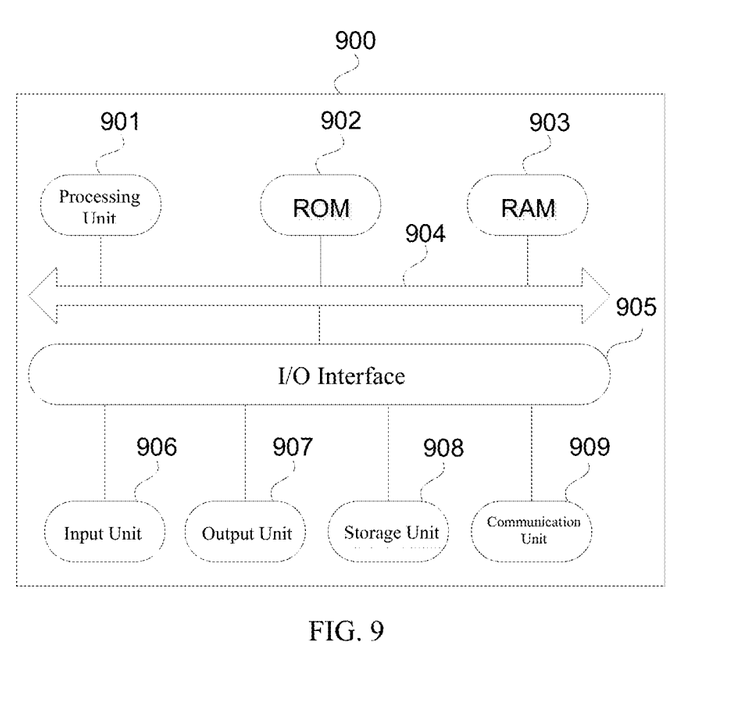
FIG. 9 is a structural schematic view of an electronic device provided in an embodiment of the present application.

As shown in FIG. 9, the electronic device 900 can comprise a processing unit (e.g., a central processing unit, a graphics processing unit and etc.) 901, which can perform various appropriate actions and processes according to a program stored in a read only memory (ROM) 902 or a program loaded from a storage unit 908 into a random-access memory (RAM) 903. The RAM 903 further stores various programs and data required to operate the electronic device 900. The processing unit 901, ROM 902 and RAM 903 are interconnected with each other via a bus 904. An input/output (I/O) interface 905 is also connected to the bus 904.

Typically, the following units can be connected to the I/O interface 905: an input unit 906 including, e.g., a touch screen, a touch pad, a keyboard, a mouse, a camera, a microphone, an accelerometer, a gyroscope, and etc.; an output unit 907 including, e.g., a liquid crystal display (LCD), a speaker, a vibrator, and etc.; a storage unit 908 including, e.g., a magnetic tape, a hard disc, and etc.; and a communication unit 909. The communication unit 909 can allow the electronic device 900 to communicate with other devices in a wired or wireless manner to exchange data. Although FIG. 9 shows the electronic device 900 with various units, it is not necessary to implement or include all the units as shown. Alternatively, the electronic device may be implemented with or have more or less units.

According to the embodiments of the present disclosure, a process described above with reference to the flowchart can be performed as a computer software program. For example, an embodiment of the present disclosure comprises a computer program product comprising a computer program carried on a non-transitory computer-readable medium, wherein the computer program comprises program codes configured to execute the method shown in the flowchart. In such an embodiment, the computer program can be downloaded and installed via the communication unit 909 from the Internet, or installed from the storage unit 908, or installed from the ROM 902. When the computer program is executed by the processing unit 901, the functions defined in the method of determining a video fluency of the embodiment of the present disclosure are performed.

The above computer-readable medium in the present disclosure can be a computer-readable signal medium, or a computer-readable storage medium, or any combination thereof. For example, the computer-readable storage medium can be, but is not limited to, an electric, magnetic, optical, electromagnetic, infrared or semiconductor system, apparatus, device, or any combination thereof. Examples of the computer-readable storage medium can comprise, but are not limited to: electric connection with one or more wires, portable computer magnetic disc, hard disc, random accessible memory (RAM), read-only memory (ROM), erasable programmable read-only memory (EPROM or flash memory), optical fiber, portable compact disc read-only memory (CD-ROM), optical storage device, magnetic storage device, or any suitable combination thereof. In the present disclosure, the computer-readable storage medium can be any tangible medium containing or storing a program that can be used by or in combination with an instruction execution system, apparatus or device. And in the present disclosure, the computer-readable signal medium can comprise a data signal propagated in baseband or as a part of carrier wave, which carries computer-readable program codes. Such propagated data signal can be in many forms, including, but being not limited to, electromagnetic signal, optical signal, or any suitable combination thereof. The computer-readable signal medium can also be any computer-readable medium in addition to the computer-readable storage medium, which can send, propagate, or transmit a program used by or in combination with an instruction execution system, apparatus, or device. The program codes contained in the computer-readable medium can be transmitted by any suitable medium including, but being not limited to, electric wire, optical cable, radio frequency (RF), or any suitable combination thereof.

In some embodiments, the user and the server can communicate by using any network protocol that is currently known or will be developed in future, such as, hypertext transfer protocol (HTTP), and can be interconnected with a digital data communication in any form or medium (e.g., communication network). Examples of the communication network comprise Local Area Network ("LAN"), Wide Area Network ("WAN"), Internet work (e.g., the Internet) and end-to-end network (e.g., ad hoc end-to-end network), and any network that is currently known or will be developed in future.

The above computer-readable medium can be contained in the above electronic device; or it can also be independently present and is not assembled in the electronic device.

The above computer-readable medium carries one or more programs, and the one or more programs, when executed by the electronic device, enable the electronic device to receive a play operation for a current video; plays the current video and displays a feedback control for the current video on a video play page when the current video is a target video, wherein the feedback control is configured to trigger a non-interest feedback on the current video; and plays the current video on the video play page when the current video is not the target video.

The computer program codes for performing the operations of the present disclosure may be written in one or more programming languages or a combination thereof. The above-mentioned programming languages include but are not limited to object-oriented programming languages, such as, Java, Smalltalk, C++, and also include conventional procedural programming languages such as the "C" programming language or similar programming languages. The program codes may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including LAN or WAN, or the remote computer may be connected to an external computer (for example, through the Internet, by using an Internet service provider).

The flowcharts and block diagrams in the accompanying drawings illustrate the architecture, functionality, and operation for possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the module or unit itself.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), and etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. Examples of machine-readable storage medium include electrical connection with one or more wires, portable computer disk, RAM, ROM, EPROM or flash memory, optical fiber, CD-ROM, optical storage device, magnetic storage device, or any suitable combination of the foregoing.

According to one or more embodiments of the present disclosure, example 1 provides a video playing method comprising:
  receiving a play operation for a current video;
  playing the current video on a video play page and displaying a feedback control for the current video when the current video is a target video, wherein the feedback control is configured to trigger a non-interest feedback on the current video; and
  playing the current video on the video play page when the current video is not the target video.

According to one or more embodiments of the present disclosure, example 2 provides a method according to example 1, wherein the displaying the feedback control for the current video comprises:
  displaying the feedback control for the current video and a preset control; or
  replacing the preset control with the feedback control for the current video and displaying the feedback control.

According to one or more embodiments of the present disclosure, example 3 provides a method according to example 1, further comprising, after the displaying the feedback control for the current video:
  in response to a triggering operation for the feedback control, displaying a feedback-reason window in which at least two feedback reasons are displayed; and
  in response to a triggering operation for a target feedback reason of the at least two feedback reasons, sending a first feedback message on the current video to a server, wherein the first feedback message carries a reason identification of the target feedback reason.

According to one or more embodiments of the present disclosure, example 4 provides a method according to example 3, wherein different feedback reasons correspond to different feedback dimensions including a background music dimension.

According to one or more embodiments of the present disclosure, example 5 provides a method according to example 1, further comprising, after the displaying the feedback control for the current video:
  in response to a triggering operation for the feedback control, displaying a feedback confirmation window in which a confirmation control is displayed; and
  in response to a triggering operation for the confirmation control, sending a second feedback message on the current video to a server.

According to one or more embodiments of the present disclosure, example 6 provides a method according to any one of examples 1 to 5, wherein the playing the current video on the video play page when the current video is not the target video comprises: playing the current video on the video play page and displaying a feedback prompt message when the current video is not the target video and a current condition satisfies a preset display condition of the feedback prompt message, wherein the feedback prompt message is used to prompt a feedback path for providing a non-interest feedback.

According to one or more embodiments of the present disclosure, example 7 provides a method according to example 6, wherein the preset display condition comprises that a number of times of displaying the feedback prompt message does not reach a current preset number threshold, and after displaying the feedback prompt message, the method further comprises:

in response to a cancel prompt operation for the feedback prompt message, canceling the display of the feedback prompt message, wherein the current preset number threshold decreases after canceling the display of the feedback prompt message.

According to one or more embodiments of the present disclosure, example 8 provides a video playing apparatus, comprising:

an operation receiving module configured to receive a play operation for a current video;

a control display module configured to play the current video on a video play page and display a feedback control for the current video when the current video is a target video, wherein the feedback control is configured to trigger a non-interest feedback on the current video; and a video play module configured to play the current video on the video play page when the current video is not the target video.

According to one or more embodiments of the present disclosure, example 9 provides an electronic device, comprising:

one or more processors; and a memory configured to store one or more programs, wherein when the one or more programs are executed by the one or more processors, the one or more processors performs the video playing method according to any of examples 1 to 7.

According to one or more embodiments of the present disclosure, example 10 provides a computer-readable storage medium with a computer program stored thereon, wherein when the program is executed by a processor, the computer is caused to perform the method according to any of examples 1 to 7.

According to one or more embodiments of the present disclosure, example 11 provides a computer program product, wherein when the computer program product is executed by a computer, the computer is caused to perform the video playing method according to any of examples 1 to 7.

Moreover, although multiple operations are described in a specific order, it should be not be construed that these operations are required to be performed in the shown specific order or in a sequential order. Under certain circumstances, multitasking and parallel processing may be beneficial. Likewise, although several implementation details are contained in the above discussion, they should not be construed as limiting the scope of the present disclosure. Some features described in the context of separate embodiments can also be combined in a single embodiment. On the contrary, some features described in the context of a single embodiment can also be implemented in multiple embodiments, alone or in any sub-combination.

Although the subject matter has been described in language specific to structural features and/or methodological logical acts, it should be understood that the subject matter defined in the appended claims is not necessarily limited to the specific features or actions described above. On the contrary, the specific features and actions described above are only exemplary forms of implementing the claims.

The invention claimed is:

1. A video playing method, comprising:

receiving a play operation for a current video;

determining whether the current video is associated with a feedback score that is greater than or equal to a preset score threshold;

playing the current video on a video play page and displaying a feedback control for the current video in response to determining that the current video is associated with the feedback score that is greater than or equal to the preset score threshold, wherein the feedback control is configured to trigger a non-interest feedback on the current video; and playing the current video on the video play page without displaying the feedback control in response to determining that the current video is not associated with the feedback score that is greater than or equal to the preset score threshold.

2. The method according to claim 1, wherein the displaying the feedback control for the current video comprises:

displaying the feedback control for the current video and a preset control; or replacing the preset control with the feedback control for the current video and displaying the feedback control.

3. The method according to claim 1, wherein, after the displaying the feedback control for the current video, the method further comprises:

displaying a feedback-reason window in which at least two feedback reasons are displayed in response to a triggering operation for the feedback control; and sending a first feedback message on the current video to a server in response to a triggering operation for a target feedback reason of the at least two feedback reasons, wherein the first feedback message carries a reason identification of the target feedback reason.

4. The method according to claim 3, wherein different feedback reasons correspond to different feedback dimensions including a background music dimension.

5. The method according to claim 1, wherein, after the displaying the feedback control of the current video, the method further comprises:

displaying a feedback confirmation window in which a confirmation control is displayed in response to a triggering operation for the feedback control; and sending a second feedback message on the current video to a server in response to a triggering operation for the confirmation control.

6. The method according to claim 1, wherein the playing the current video on the video play page without displaying the feedback control in response to determining that the current video is not associated with a feedback score that is greater than or equal to the preset score threshold comprising:

playing the current video on the video play page and displaying a feedback prompt message in response to determining that a current condition satisfies a preset display condition of the feedback prompt message, wherein the feedback prompt message is used to prompt a feedback path for providing the non-interest feedback.

7. The method according to claim 6, wherein the preset display condition comprises that a number of times of displaying the feedback prompt message does not reach a current preset number threshold, and after the displaying the feedback prompt message, the method further comprises:
  canceling the displaying of the feedback prompt message in response to a cancel prompt operation for the feedback prompt message, wherein the current preset number threshold decreases after canceling the displaying of the feedback prompt message.

8. A non-transitory computer-readable storage medium, storing computer programs that, when executed by a processor, cause the processor to perform the method of claim 1.

9. A computer program product, wherein when the computer program product is executed by a computer, the computer is caused to perform the video playing method of claim 1.

10. A video playing apparatus, comprising:
  an operation receiving module configured to receive a play operation for a current video;
  a module configured to determine whether the current video is associated with a feedback score that is greater than or equal to a preset score threshold;
  a control display module configured to play a current video on a video play page and display a feedback control for the current video in response to determining that the current video is associated with the feedback score that is greater than or equal to the preset score threshold, wherein the feedback control is configured to trigger a non-interest feedback on the current video; and
  a video play module configured to display the current video on the video play page without displaying the feedback control in response to determining that the current video is not associated with the feedback score that is greater than or equal to the preset score threshold.

11. The apparatus according to claim 10, wherein the control display module is further configured to:
  display the feedback control for the current video and a preset control; or
  replace the preset control with the feedback control for the current video and display the feedback control.

12. The apparatus according to claim 10, wherein, after display the feedback control for the current video, the control display module is further configured to:
  display a feedback-reason window in which at least two feedback reasons are displayed in response to a triggering operation for the feedback control; and
  send a first feedback message on the current video to a server in response to a triggering operation for a target feedback reason of the at least two feedback reasons, wherein the first feedback message carries a reason identification of the target feedback reason.

13. The apparatus according to claim 12, wherein different feedback reasons correspond to different feedback dimensions including a background music dimension.

14. An electronic device, comprising:
  at least one processor; and
  a memory configured to store at least one program,
  wherein when the at least one program is executed by the at least one processor, the at least one processor is caused to:
  receive a play operation for a current video;
  determine whether the current video is associated with a feedback score that is greater than or equal to a preset score threshold;
  play the current video on a video play page and display a feedback control for the current video in response to determining that the current video is associated with the feedback score that is greater than or equal to the preset score threshold, wherein the feedback control is configured to trigger a non-interest feedback on the current video; and
  play the current video on the video play page without displaying the feedback control in response to determining that the current video is not associated with the feedback score that is greater than or equal to the preset score threshold.

15. The electronic device according to claim 14, wherein the at least one processor is further caused to:
  display the feedback control for the current video and a preset control; or
  replace the preset control with the feedback control for the current video and display the feedback control.

16. The electronic device according to claim 14, wherein, after the display of the feedback control for the current video, the at least one processor is further caused to:
  display a feedback-reason window in which at least two feedback reasons are displayed in response to a triggering operation for the feedback control; and
  send a first feedback message on the current video to a server in response to a triggering operation for a target feedback reason of the at least two feedback reasons, wherein the first feedback message carries a reason identification of the target feedback reason.

17. The electronic device according to claim 16, wherein different feedback reasons correspond to different feedback dimensions including a background music dimension.

18. The electronic device according to claim 14, wherein, after the display the feedback control of the current video, the at least one processor is further caused to:
  display a feedback confirmation window in which a confirmation control is displayed in response to a triggering operation for the feedback control; and
  send a second feedback message on the current video to a server in response to a triggering operation for the confirmation control.

19. The electronic device according to claim 14, wherein the at least one processor is further caused to:
  play the current video on the video play page and display a feedback prompt message in response to determining that the current video is not associated with a feedback score that is greater than or equal to the preset score threshold and a current condition satisfies a preset display condition of the feedback prompt message, wherein the feedback prompt message is used to prompt a feedback path for providing the non-interest feedback.

20. The electronic device according to claim 19, wherein the preset display condition comprises that a number of times of displaying the feedback prompt message does not reach a current preset number threshold, and after the display of the feedback prompt message, the at least one processor is further caused to:
  cancel the display of the feedback prompt message in response to a cancel prompt operation for the feedback prompt message, wherein the current preset number threshold decreases after canceling the display of the feedback prompt message.

* * * * *